United States Patent [19]

Chung

[11] Patent Number: 4,723,190

[45] Date of Patent: Feb. 2, 1988

[54] SAFETY DEVICE COMMUNICATION EQUIPMENT

[75] Inventor: Ki H. Chung, Seoul, Rep. of Korea

[73] Assignee: Samhwa Electric Industrial Co., Ltd., Seoul, Rep. of Korea

[21] Appl. No.: 888,040

[22] Filed: Jul. 18, 1986

Related U.S. Application Data

[63] Continuation-in-part of Ser. No. 844,548, Mar. 27, 1986, Pat. No. 4,692,833.

[30] Foreign Application Priority Data

May 11, 1985 [KR] Rep. of Korea ................. 5469/1985
Sep. 26, 1985 [KR] Rep. of Korea ............... 12567/1985

[51] Int. Cl.⁴ .......................... H02H 3/20; H02H 3/08

[52] U.S. Cl. ........................................ 361/91; 361/93; 361/105; 361/111; 361/124

[58] Field of Search ........................ 361/86, 87, 91, 93, 361/99, 103, 105, 110, 111, 119, 124; 337/34, 36

[56] References Cited

U.S. PATENT DOCUMENTS 3,743,888 7/1973 Baumbach ........................ 361/93 X
4,396,969 8/1983 Fasano ........................... 361/119 X
4,424,546 1/1984 Smith ................................ 361/119
4,502,088 2/1985 Baumbach .......................... 361/124
4,538,201 8/1985 Wuyts et al. .................... 361/105 X

*Primary Examiner*—Philip H. Leung
*Assistant Examiner*—Derek S. Jennings
*Attorney, Agent, or Firm*—Willian Brinks Olds Hofer Gilson & Lione

[57] ABSTRACT

A safety connector providing an overcurrent protective element, an overvoltage protective element and bimetal connecting terminals, in which the overcurrent protective element includes an upper terminal and lower terminal on the upper and lower part of the body, and which includes bimetal connecting terminals within the body, and a heating coil connected to the upper terminal and to a bimetal connecting terminal. Another bimetal connecting terminal is connected to the lower terminal. An overvoltage protective element is mounted on the bimetal connecting terminals on the electrodes and grounding electrode, respectively, and leading ends of the bimetal connecting terminals are placed to face each other.

10 Claims, 13 Drawing Figures

SAFETY DEVICE COMMUNICATION EQUIPMENT

REFERENCE TO OTHER APPLICATIONS

This application is a continuation-in-part of U.S. patent application Ser. No. 844,548, filed Mar. 27, 1986, U.S. Pat. 4,692,833.

TECHNICAL FIELD

The present invention relates generally to a safety device for protecting communication equipment. It is more specifically directed to a safety device in which overcurrent or overvoltage produced on the output line is not applied to the input side in the communication equipment, the overvoltage or overcurrent being produced by the output line contacting a high voltage line, or due to lightning. The safety device is reusable because it quickly returns to its original state when the overcurrent or overvoltage is removed.

BACKGROUND OF THE INVENTION

In my aforesaid pending application, whose disclosure is incorporated herein by reference, there is disclosed a safety device for communication equipment, particularly a safety device which protects against the undesired application of overcurrent or overvoltage on the equipment side when the equipment is arranged between the output line side and the input line side in communication lines, and the overcurrent or the overvoltage on the output line side is produced by the output line contacting a high voltage line, or due to lightning. In the case of an overvoltage in my prior device, the facing bimetal protective elements formed a closed circuit when the temperature thereof increased because of a discharge, whereby the overvoltage was grounded. Accordingly, the overvoltage created no danger of a fire because the overvoltage protective elements had a potential difference of zero(0). Further, when the overcurrent and overvoltage were removed, the terminals were returned to their original state.

Within the prior art, FIG. 12, safety connector 100 is comprised of a cylindrical tube 105 which has a heating coil 102 wound on the outer circumference thereof. Tube 105 is secured on the upper surface of the connecting terminal that is mounted on the upper surface of the inserting terminal. As illustrated in FIG. 13, coil 102 is serially connected in the line of the safety connector.

In the upper end portion of the cylindrical tube 105 is inserted a projecting piece 104 which is secured to the tube 105 by solder 103 of relatively low melting temperature. On the upper surface of the projecting piece 104 is mounted a discharge tube 106 which is enclosed within an electrical ground case 101. As illustrated in FIGS. 12A and 13A, ground case 101 normally is physically and electrically out of contact with the connecting terminal. It is seen that each safety connector 100 serves two communication lines.

Spring 107 is retained in compression between ground case 101 and a ground plate 109, which is electrically and physical attached to ground terminal 108. When current below a predetermined value flows in the communication line heating coil 102, heating coil 102 of the safety connector 100 does not cause overheating and the solder 103 that holds projecting piece 104 above the end of tube 105 is not melted.

However, when current above a predetermined value flows through heating coil 102, this overcurrent causes heating coil 102 to produce sufficient heat to melt the solder that holds projecting piece 104 in the tube 105. Accordingly, projecting piece 104 is pushed downwardly and within the cylindrical tube 105 by the force of the spring 107 acting on ground case 101, discharge lamp 106 and the projecting piece. The circumferential surface on the lower end of ground case 101 now makes physical and electrical contact with the connecting terminal, see FIGS. 12B and 13B, and the overcurrent is coupled to ground through the path of the connecting terminal, ground case 101, spring 107, ground plate 109 and ground terminal 108. Accordingly, damage to the communication equipment by the overcurrent may be avoided.

Further, when overvoltage is applied in the circuit, a discharge is produced within the discharge tube 106 of the safety connector 100. Thus, the grounding circuit having the electrical path through the inserting terminal, tube 105, projecting piece 104, discharge tube 106, ground case 101, spring 107, ground plate 109 and the ground terminal 108 is formed to provide a path to ground. Accordingly, damage to the communication equipment by the overvoltage is avoided.

In the prior art device shown in FIGS. 12 and 13, the discharge tube 106 is a cylindrical ceramic member having two facing electrodes.

Because of the production of high heat in the prior art safety devices (for example, up to about 1,600° C.), damage because of fire is possible.

Upon occurrence of the overcurrent as described above, the ground case 101 comes into contact with the connecting terminal. Accordingly, when the overcurrent or overvoltage is applied, the above-described prior art device has drawbacks which make it desirable to make changes in the safety connector 100, or components thereof. Further, the prior art device requires testing or inspection of each of the individual circuits because direct visual inspection of the safety connector 100 is not possible. Additionally, in the prior art safety device, when dealing with tens of thousands to hundreds of thousands of lines, the required size of the safety device becomes quite large.

Because the inner wiring of the terminal stand is connected by solder, the electric wire working processes are complex, difficult, and time consuming. Accordingly, the production cost is high. Additionally, errors in making the wiring connections reduce the reliability of such devices. Furthermore, Korean laid-open Utility Model Publication No. 2198/1983 (Published Nov. 14, 1983, "Safety Device for Communication") discloses constructions in which the safety circuit is returned to the original state, together with an overvoltage protective element that cut off overcurrent by resistance, and uses a base stand that includes printed circuitry.

In the above Utility Model Publication, by arranging printed circuitry on the base stand unit that provides the terminal stand, productivity is increased and wiring errors are eliminated. However, when each of the input and output terminals is, one by one, connected by solder joints on both end portions of the print circuit of the base stand unit, and in particular, when the overcurrent is caused by lightning, current above 200 A is instanteously passed. Accordingly, the printed circuitry possibly may be damaged. Further, because the overcurrent protective element that controls the flow of current is a resistance element, the fixed resistance value has a tendency to increase with time and usage. Thus, sensitivity of the communication equipment is lowered.

On the other hand, the overvoltage protective element is deficient in security because the discharge tube is possibly damaged by the heat of discharge.

SUMMARY OF THE INVENTION

It is the purpose of the present invention to provide a safety device for protecting communication equipment having a safety connector providing an overcurrent protective element, an overvoltage protective element and bimetal connecting terminals, comprising an overcurrent protective element which includes an upper terminal and lower terminal on the upper and lower part of the body of the overcurrent protective element, and which includes bimetal connecting terminals within the body, and has a heating coil connected to the upper terminal and to a bimetal connecting terminal. Another bimetal connecting terminal is connected to the lower terminal. An overvoltage protective element is mounted on the bimetal connecting terminals on the electrodes and grounding electrode, respectively, and leading ends of the bimetal connecting terminals are placed to face each other.

In order to solve the deficiencies of the prior art, the present invention comprises a safety device which has an overcurrent protective element comprised of two or three bimetal connecting terminals and a heating coil wound on the outer circumference of the metal connecting terminals, an overvoltage protective element having bimetal protective elements on the electrodes and earth electrode. The overcurrent is quickly cut-off because the bimetal connecting terminal provides an opened circuit by the heat of the heating coil in flow of overcurrent.

BRIEF DESCRIPTION OF THE DRAWINGS

FIGS. 4(A) and (B) are sectional views showing operational states of the overcurrent protective element in FIG. 3, in which FIG. 4(A) is a sectional view illustrating the operating state with normal current, and FIG. 4(*b*) is a sectional view illustrating the operating state with overcurrent.

DESCRIPTION OF PREFERRED EMBODIMENT

Figure 3:
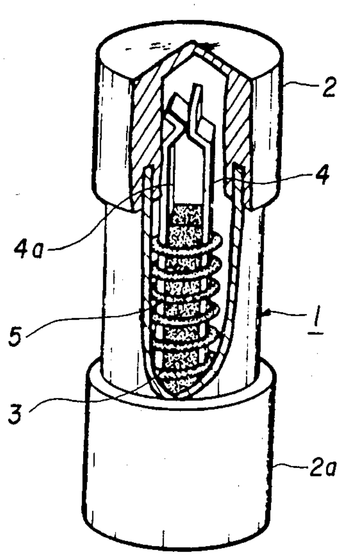
FIG. 3 is a partially cut away perspective view showing overcurrent protective element according to the present invention.

Turning now more specifically to FIGS. 3 through 8 in respect to the overcurrent protective elements according to the present invention, reference 1 in FIGS. 3 to 5 as one embodiment of the present invention, is a body of the overcurrent protective element comprising upper terminal 2 and lower terminal 2*a* at opposite ends of a hollow tubular cartridge. The bimetal connecting terminals 4 and 4*a* are disposed on opposite sides of insulator 3 within the body 1 of the overcurrent protective element. On the outer circumference of two bimetal connecting terminals 4 and 4*a* is wound the heating coil 5. One end of the heating coil 5 is connected to the upper terminal 2 of the overcurrent protective element and the opposing end of the heating coil 5 is connected to the lower terminal 2*a* of the body 1 of the overcurrent protective element, by way of the normally closed contacts of bimetal terminals 4*a* and 4.

Figure 5A:
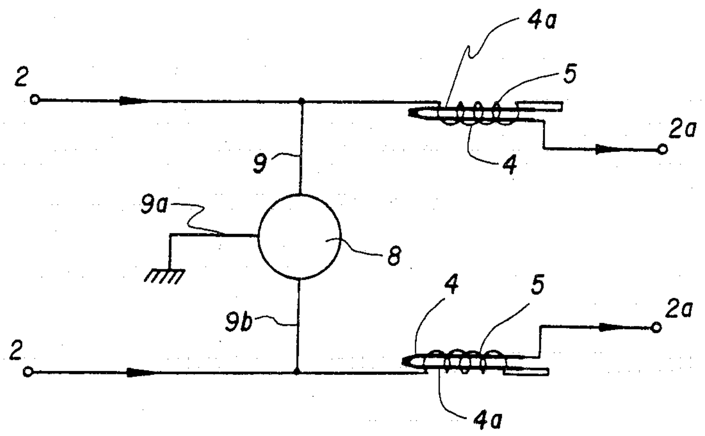
FIGS. 5(A) and (B) are circuit diagrams illustrating operational states of FIGS. 4(A) and (B).
Figure 5B:
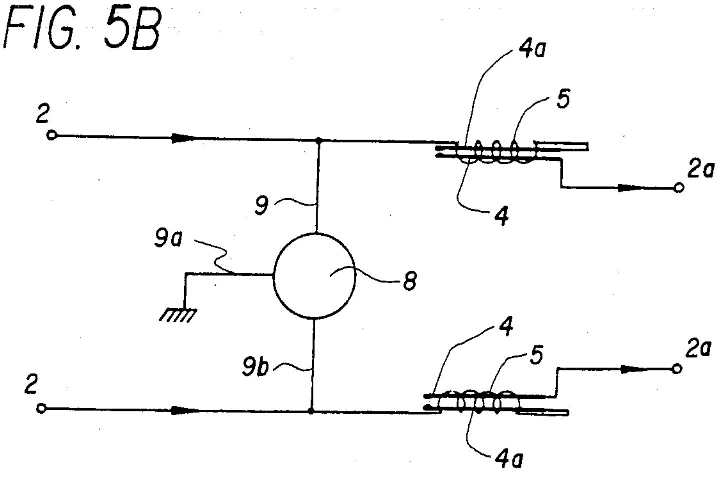
Figure 6:
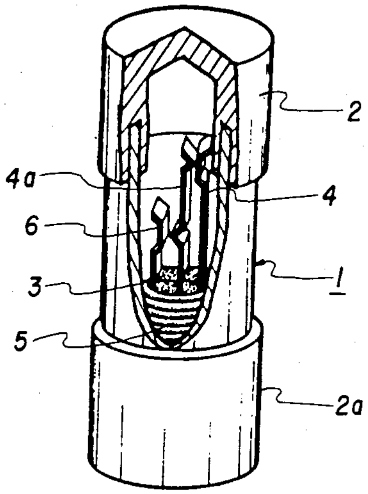
FIG. 6 is a partially cut away perspective view showing an overcurrent protective element of other embodyment according to the present invention.
Figure 7A:
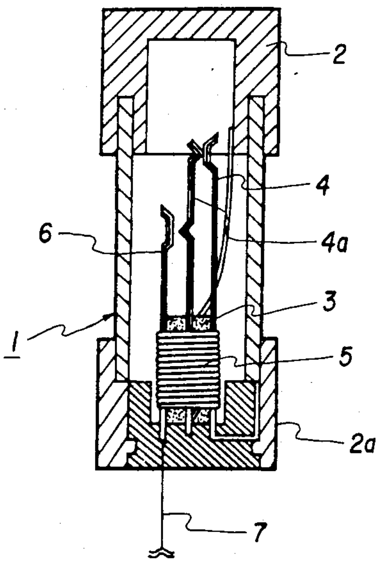
FIGS. 7 (A) and (B) are sectional views showing operational states of the overcurrent protective element of FIG. 6, in which FIG. 7 (A) is a sectional view illustrating the operating state with normal current
FIG. 7(B) is a sectional view illustrating the operating state with overcurrent.
Figure 7B:
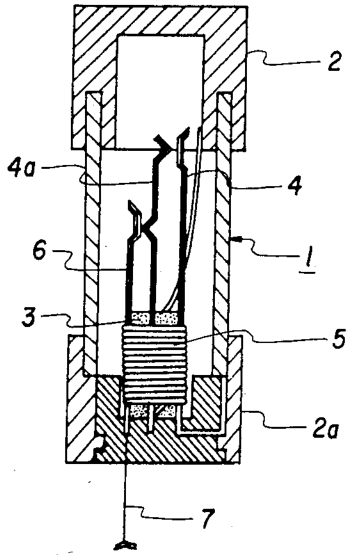
Figure 8A:
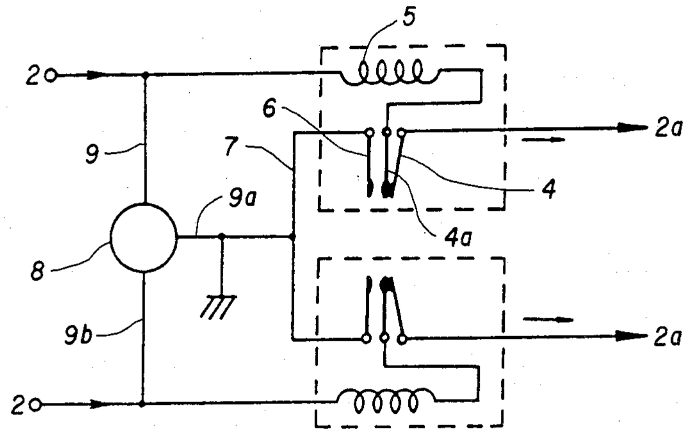
FIGS. 8 (A) and (B) are circuit diagrams illustrating operational states of FIGS. 7 (A) and (B).
Figure 8B:
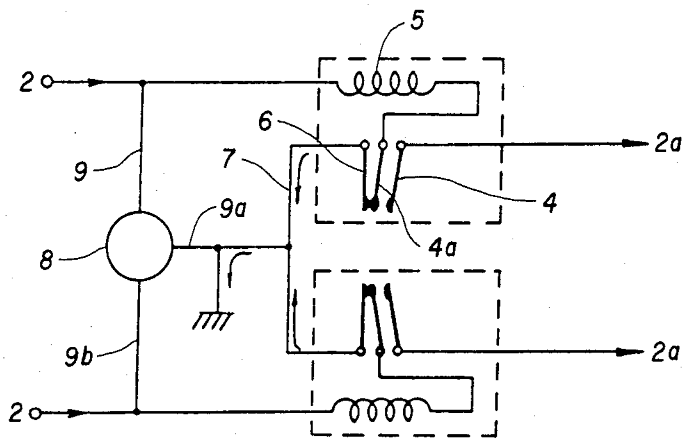

Next, as another embodyment of the present invention, FIGS. 6 to 8 are similar to FIGS. 3 to 5 in construction. However, in FIGS. 6 to 8, a third bimetal connecting terminal 6 is positioned on one side of the bimetal connecting terminal 4*a* and connected with the heating coil 5. Ground terminal 7 is formed on the lower end of the terminal 6.

Figure 9:
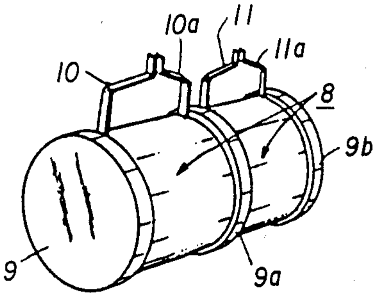
FIG. 9 is a perspective view showing an overvoltage protective element according to the present invention.
Figure 11A:
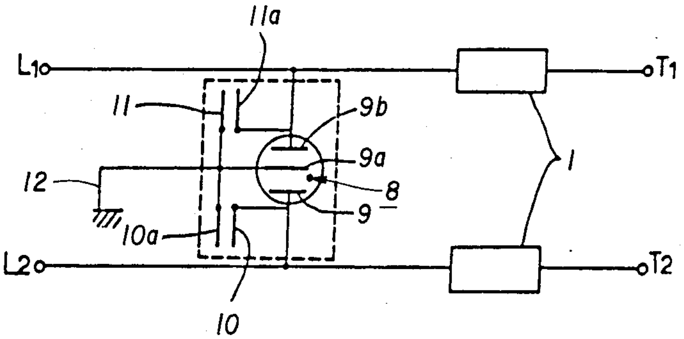
FIGS. 11(A) and (B) are circuit diagrams illustrating operational states of FIGS. 10(A) and (B).
Figure 11B:
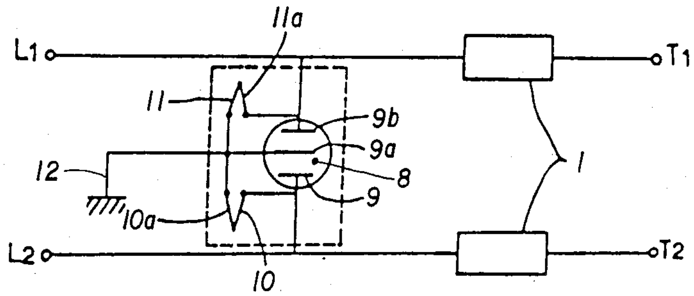
Figure 12A:
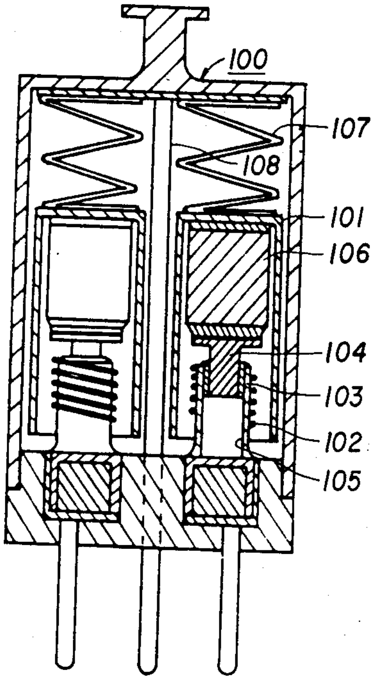
FIG. 12A (PRIOR ART)
FIGS. 12 (A) and (B) are sectional views illustrating a prior art safety connector, in which FIG. 12 (A) is a sectional view illustrating the operating state with normal current, and FIG. 12 (B) is a sectional view illustrating state the operating with overcurrent or overvoltage.
Figure 12B:
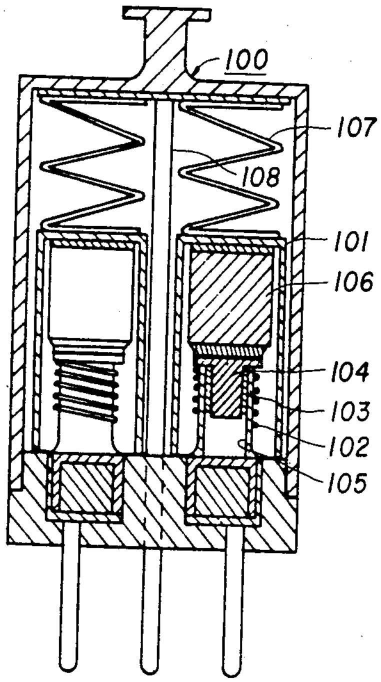
FIG. 12B (PRIOR ART)
Figure 13A:
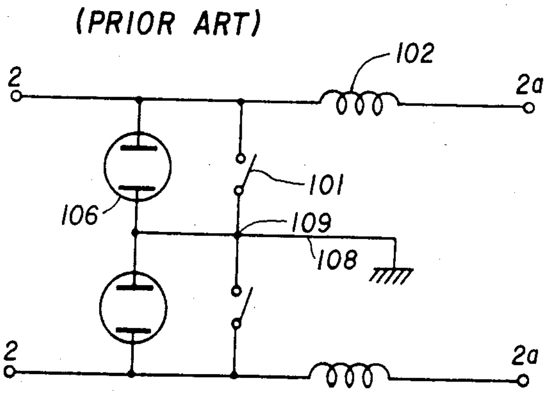
FIG. 13A (PRIOR ART)
FIGS. 13 (A) and (B) are circuit diagrams illustrating operational states of FIGS. 12(A) and (B).
Figure 13B:
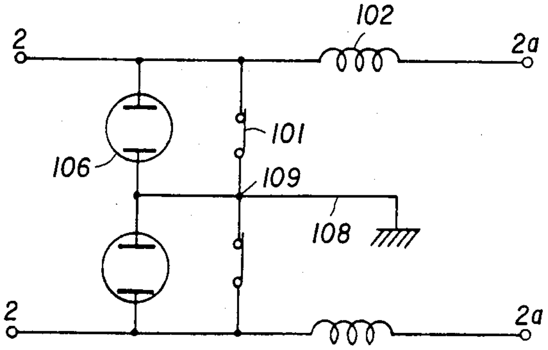
FIG. 13B (PRIOR ART)

Further, FIGS. 9 and 11 show the construction of an overvoltage protective element in accordance with the present invention. Reference numeral 8 indicates a body of ceramics having electrodes 9, 9*a* and 9*b* on both ends and middle portion of the overvoltage protective element. Ceramic body 8 encloses an overvoltage discharge medium, i.e., and ionizable gas or a plasma that breaks down to conduct current at some predetermined voltage level between the electrodes. Bimetal protective elements 10, 10*a* and 11, 11*a* of the body 8 are disposed in spaced apart relationship between electrodes 9, 9*a* and 9*b*, respectively, and the middle electrode 9*a* is connected to the ground terminal 12.

Figure 1:
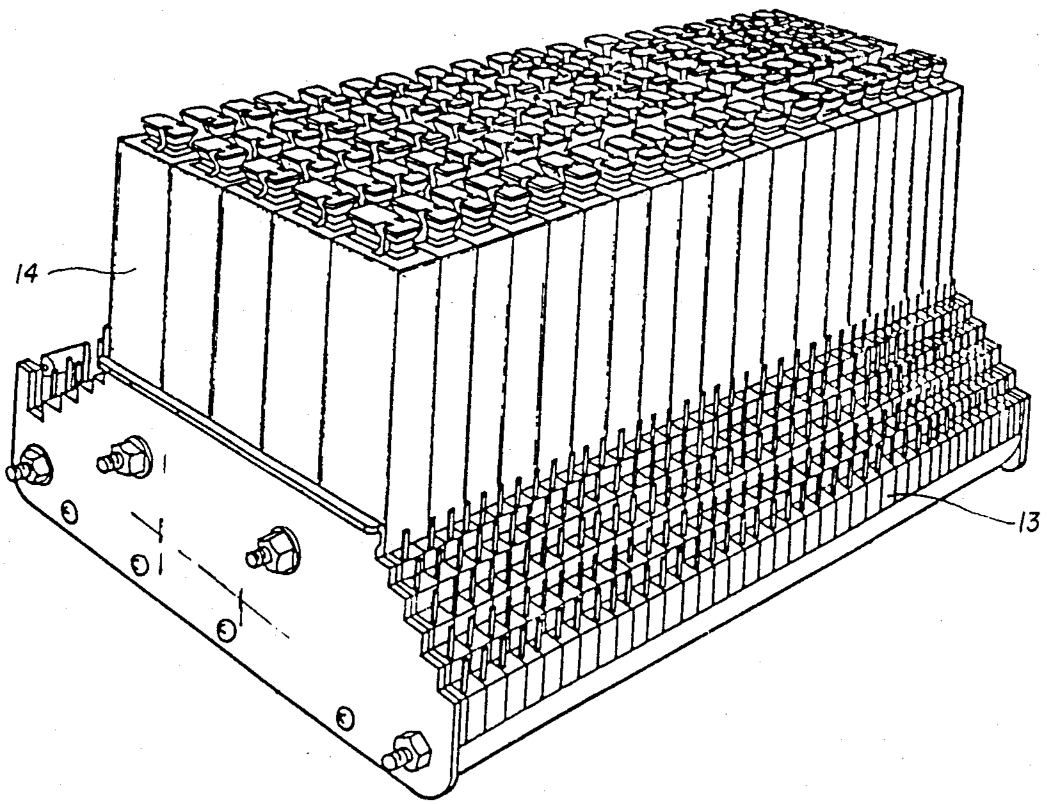
FIG. 1 is an entire perspective view showing safety connectors mounted on a safety device according to the present invention.

Reference numberal 13 in FIG. 1 shows a safety connector base, and reference numeral 14 shows the safety connectors of the safety device. Accordingly, the present invention, as stated above, is provided by protecting the communicating equipments from the overcurrent and overvoltage to be applied from the output lines of the safety device. The overcurrent protective element of the safety device operates to quickly return to its original state and the overvoltage protective element removes the danger of fire due to heating.

Figure 2:
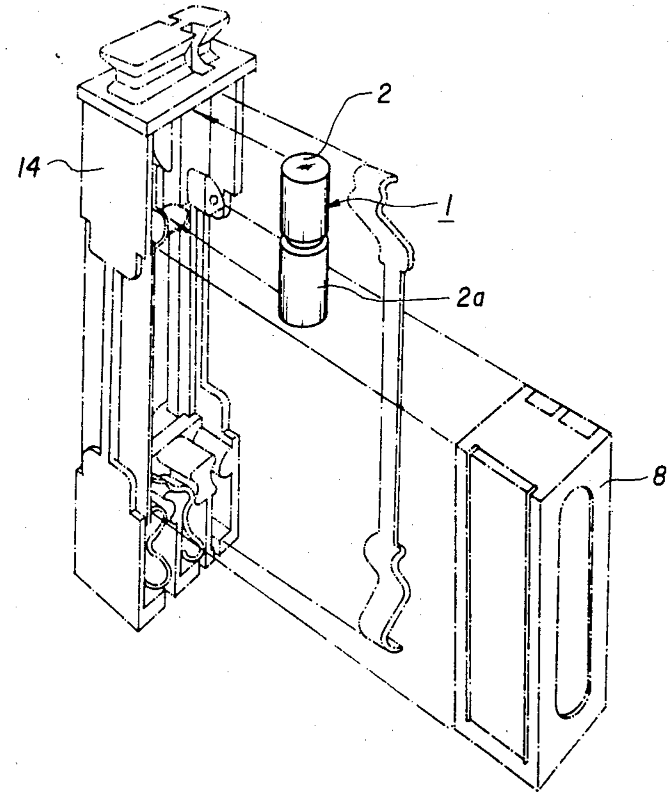
FIG. 2 is an exploded perspective view showing a protective element according to the present invention.

As illustrated in FIG. 2 of the attached drawings, overcurrent protection element 1 and overvoltage protection element 8 are housed in safety connector 14. Reference is made to my above-identified pending application for further details of a safety connector construction.

Figure 4A:
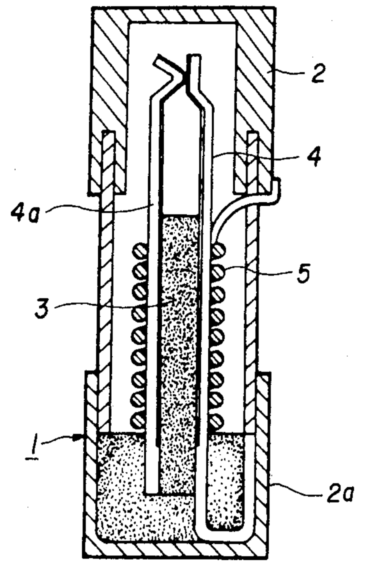
Figure 4B:
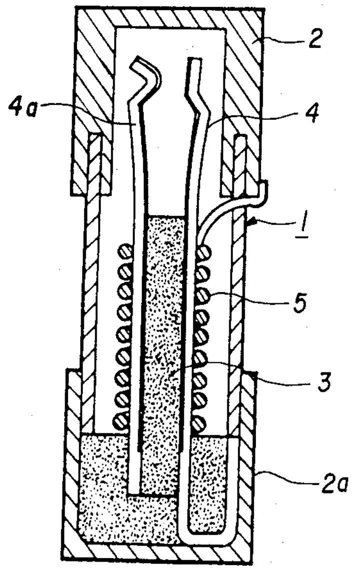

Firstly, the operation of FIGS. 3 to 5 will be described in greater detail. When current is flowing normally, it flows from upper terminal 2, through heating coil 5, bimetal connecting terminals 4a, 4 to the lower terminal 2a of the overcurrent protective element. However, when an overcurrent occurs, it is applied from the upper terminal 2, through heating coil 5 to bimetal connecting terminal 4a. Because of the heating of bimetal terminals 4 and 4a by heating coil 5, the bimetal terminals move from the closed positions of FIGS. 4A and 5A to the open positions of FIGS. 4B and 5B. Consequently, the circuit to output terminal 2 is open. As a result, the communication equipment on the input line side (terminal 2a) is protected because the overcurrent flowing into the bimetal connecting terminal 4a is not applied to the opposite bimetal connecting terminal 4.

The overcurrent protective elements shown in FIGS. 6 to 8 have the same operation as in the embodiment of FIGS. 3 to 8. However, both of the terminals 4 and 4a by separating outwardly as a result of the overcurrent, and the additional bimetal connecting terminal 6, disposed on the side of the terminal 4a, bends toward and contacts the terminal 4a. Consequently, the overcurrent is applied to the path through the upper terminal 2, heating coil 5, the terminal 4a, and is grounded through terminal 6 to the ground terminal 7.

Accordingly, the above described overcurrent protective elements shown in FIGS. 6 to 8 have the advantages of safety by causing the overcurrent to flow into ground through the ground terminal 7. The flow of the current, in a normal state, is the same as in the overcurrent protective elements of FIGS. 3 to 5. Further, when the above described overcurrent is removed, the terminals 4, 4a and 6 are returned to their original states and contacts of the terminals 4 and 4a are closed. The normal current flows into the communication equipment through the upper terminal 2, the heating coil 5, the terminal 4a terminal 4 and lower terminal 2a, in order. The contacts of the terminals 4a and 6 are opened, and grounding of the applied current is prevented. Accordingly, reoperation of the terminals is achieved.

Figure 10A:
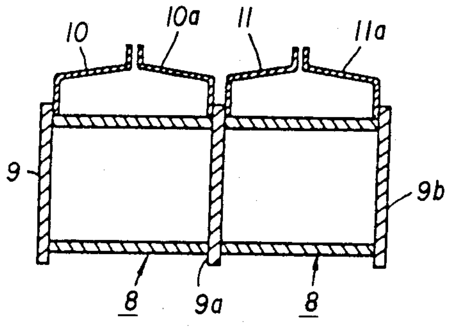
FIGS. 10 (A) and (B) are sectional views showing operational states of the overvoltage protective element of FIG. 9, in which FIG. 10 (A) is a sectional view illustrating the operating state with normal voltage, and FIG. 10 (B) is a sectional view illustrating the operating state with overvoltage.
Figure 10B:
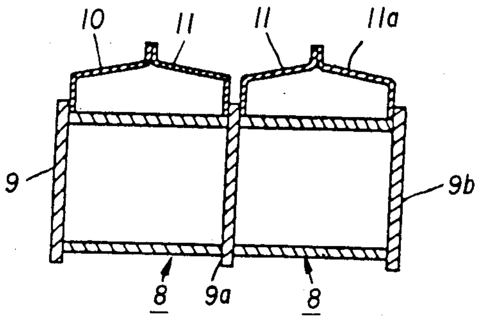

FIGS. 9 to 11 show the overvoltage protective elements. That is, when an overvoltage is applied from the output line side 2, it is applied to electrodes 9 or 9b and earth electrode 9a, and a discharge is produced. At this time, the heat produced by the discharge heats body 8 of ceramic material and its temperature rises. Accordingly, the bimetal connecting terminals 10 and 10a, or 11 and 11a, are abruptly expanded to contact each other, and closed circuits are produced by the closed contacts of those bimetal terminals. The applied overvoltage then is grounded through the ground terminal 12 and further discharge of the overvoltage protective element is terminated and no further heating occurs.

At this time, the internal resistance of the overvoltage protective element has approximately the value of 0 (zero) by reason of the closed bimetal connecting terminals 10 and 1-a, or 11 and 11a. Consequently, the potential difference between electrodes 9 and 9a or 9a and 9b also has nearly the value of 0 (zero). Accordingly, the overvoltage does not exert an adverse effect on the communication equipment, and contact between the terminals 10 and 10a or 11 and 11a is performed by a momentary discharge. The body 8 of the overvoltage protective element has minimal rise in temperature, thereby greatly reducing the danger of fire.

When the above-described operation is performed and the overvoltage is removed, the bimetal connecting terminals 10 and 10a or 11 and 11a are opened and the electrodes 9 and 9a or 9a and 9b are electrically opened. Accordingly, their terminals are returned to the original state. When an overvoltage is again applied to the terminals, the above operation is repeated and the terminals prevent the application of overvoltage onto the communication equipment.

As stated above, the present invention is to provide a safety device for protecting communication equipment having a safety connector comprising an overcurrent protective element, and overvoltage protective element, and connecting terminals proper in numbers, said overcurrent protective element limiting the overcurrent since the opened and closed circuits are formed using expansion and contraction of the bimetal connecting terminals by heat of the heating coil. The overvoltage protective element grounds the overvoltage since a closed circuit is formed by the operation of bimetal connecting terminals, the heat being produced by discharge between electrodes. When the overcurrent and overvoltage are removed, the contacts are returned to their original states by the bimetal connecting elements and normal operation is possible again.

Accordingly, the present invention has the advantages of no requirement for checking as in the prior art, has long life and reasonable production cost.

In its broader aspects, this invention is not limited to the specific embodiment illustrated and described. Various changes and modifications may be made without departing from the inventive principles herein disclosed.

I claim:

1. A safety device for protecting communication equipment having a safety connector providing an overcurrent protective element, an overvoltage protective element and bimetal connecting terminals, comprising an overcurrent protective element which has spaced upper terminal 2 and lower terminal 2a on the upper and lower part, respectively of the body 1 of the overcurrent protective element, said terminals being serially connectable in a communications line, a pair of spaced bimetal connecting terminals 4 and 4a within the body, the bimetal terminals having normally closed contacts thereon, a heating coil 5 wound about the terminals 4 and 4a, said heating coil 5 being electrically connected at one end to the upper terminal 2 and at the other end to bimetal connecting terminal 4a, the bimetal connecting terminal 4 being connected to the lower terminal 2a, an overvoltage protective element connectable between said communications line and a ground connection, said overvoltage protective element having two pairs of bimetal connecting terminals 10, 10a and 11, 11a that shunt respective pairs of electrodes of an overvoltage discharge device, wherein a ground electrode 9a is included in the discharge device and is common to the two pairs of electrodes in the discharge device.

2. The safety device claimed in claim 1 wherein another bimetal connecting terminal 6 is placed adjacent and parallel to one of the bimetal connecting terminals 4a, and is adapted to make contact therewith when heated, one end of the bimetal connecting terminal 6 being connected to a ground terminal 7.

3. A safety connector for connection to electronic equipment and to an output line protect the equipment from overcurrents and overvoltages coupled from said output line, the combination comprising a housing, first and second conductive terminals on said housing, said terminals being adapted to be serially connected between the electronic equipment and the output line, bimetal means having two terminals and supported within said housing, said bimetal means having normally closed contacts thereon, heating means positioned adjacent said bimetal means, said heating means being electrically connected between the first conductive terminal of the housing and one contact of said bimetal means, means connecting the other contact of the bimetal means to the second conductive terminal on the housing, whereby a current path for currents within normal current levels extends from said first conductive terminal, through the heating means and the normally closed contacts of the bimetal means to the second conductive terminal, but an overcurrent heats the heating means and causes the normally closed bimetal contacts to open to thereby terminate the overcurrent, said safety connector including an overvoltage protective element composed of an enclosed overvoltage discharge medium, first, second, and third discharge electrodes in communication with said discharge medium, said first and second discharge electrodes being adapted to be coupled to respective output lines that are connected to respective electronic equipment means providing a ground connection terminal for said third terminal, and first and second pairs of normally open bimetal terminals having normally open contacts respectively shunting the first and third electrodes and the second and third electrodes, said two pairs of bimetal terminals of the overvoltage protective element being constructed and arranged to be heated by an overvoltage discharge that occurs between said electrodes and to close their normally open contacts when heated, thereby to shunt to ground said first and/or second electrodes having the overvoltage thereon.

4. An overcurrent protection device for use in a safety connector that is used for protecting electronic equipment from damage due to an overcurrent, the combination comprising a housing, first and second conductive terminals on said housing, bimetal means having two terminals and supported within said housing, said bimetal means having normally closed contacts thereon, heating means positioned adjacent said bimetal means, said heating means being electrically connected between the first conductive terminal of the housing and one contact of said bimetal means, means connecting the other contact of the bimetal means to the second conductive terminal on the housing, whereby a current path for currents within normal current levels extends from said first conductive terminal, through the heating means and the normally closed contacts of the bimetal means to the second conductive terminal, but an overcurrent heats the heating means and causes the normally closed bimetal contacts to open to thereby terminate the overcurrent.

5. The overcurrent protection device of claim 4 and further including another bimetal member supported within said housing in close, but spaced, proximity to said first bimetallic member, said another bimetal member being adapted, when heated, to make electrical connection with said contact of the first bimetal member, and ground connection means connected to said another bimetal member and available at the exterior of the housing.

6. An overcurrent protection device for use in a safety device that is used for protecting electronic equipment from damage due to an overcurrent, the combination comprising a hollow cylindrical member, first and second conductive terminals on respective ends of said cylindrical member, a pair of bimetal connecting terminals supported within said cylindrical member, said bimetal terminals having portions spaced apart from each other and portions that form normally closed contacts, a heating coil wound about the spaced portions of the bimetal terminals, one end of said heating coil being connected to the first conductive terminal at one end of the cylindrical member and the opposite end of the heating coil being electrically connected to a first one of the bimetal terminals, means connecting the spaced apart portion of the second bimetal terminal to the second conductive terminal on the second end of the cylindrical member, whereby a current path for currents within normal current levels extends from said first conductive terminal, through the heating coil and the normally closed contacts of the bimetal terminals to the second conductive terminal, but an overcurrent heats the heating coil and causes the normally closed bimetal terminals to open to thereby terminate the overcurrent.

7. An overvoltage protection device for use in a safety device that is used for protecting electronic equipment from damage due to an overvoltage, the combination comprising an enclosed overvoltage discharge medium, first, second, and third discharge electrodes in communication with said discharge medium, means providing a ground connection terminal for said third terminal, and first and second pairs of normally open bimetal terminals having normally open contacts respectively shunting the first and third electrodes and the second and third electrodes, said two pairs of bimetal terminals being constructed and arranged to be heated by an overvoltage discharge that occurs between said electrodes and to close their normally open contacts when heated, thereby to shunt to ground said first and/or second electrodes having the overvoltage thereon.

8. An overvoltage protection device for use in a safety device that is used for protecting electronic equipment from damage due to an overvoltage, the combination comprising a housing having an enclosed overvoltage discharge medium therein, first, second, and third discharge electrodes in communication with said discharge medium, said third electrode being disposed symmetrically relative to the first and second electrodes, means providing a ground connection terminal for said third terminal, and first and second pairs of normally open bimetal terminals respectively shunting the first and third electrodes and the second and third electrodes, said two pairs of bimetal terminals being positioned to be heated by an overvoltage discharge between the first and/or second electrode and third electrode, whereby an overvoltage discharge heats said bimetal terminals to cause the normally open contacts to close, thereby to shunt to ground the overvoltage that appears on the first and/or second electrode.

9. The overvoltage protection device claimed in claim 8 wherein said two pairs of bimetal terminals are located on the exterior of said housing in thermal communication therewith.

10. The overcurrent protection device of claim 6 and further including a third bimetal terminal supported within said hollow cylindrical member in closed, but spaced, proximity to said first bimetallic terminal member, said third bimetal terminal being adapted when heated, to contact the first bimetal terminal, ground connection means connected to said third bimetal terminal and available at the exterior of the cylindrical member.

* * * * *